March 1, 1949.    S. M. MELTON    2,463,407
CONDUIT COUPLING
Filed Jan. 17, 1946

INVENTOR.
Samuel M. Melton.
BY
Corbett, Mahoney + Miller
ATTORNEYS

Patented Mar. 1, 1949

2,463,407

UNITED STATES PATENT OFFICE 2,463,407

CONDUIT COUPLING

Samuel M. Melton, Columbus, Ohio

Application January 17, 1946, Serial No. 641,768

1 Claim. (Cl. 285—126)

My invention relates to a conduit coupling. It has to do, more particularly, with a coupling for connecting together the plain ends of two pieces of tubing, particularly thin-wall conduit, or for connecting the plain end of conduit to electric fuse or cut-out boxes or other similar units.

There are many different types of couplings in use at the present time for connecting together the plain or unthreaded adjacent ends of thin-wall metal tubing or for similar purposes. However, these couplings usually consist of a large number of parts which results in an increase in the difficulties of manufacture and the amount of materials used and, therefore, an increase in the cost of the couplings. Also, the more parts embodied in the coupling, the more difficult it is to use in connecting the tubing and the more likely it is that some of the parts will be lost in packaging, shipping and handling the coupling, especially if the parts are not secured together. With prior art couplings, there has been considerable difficulty encountered in applying such a coupling to the adjacent ends of tubing in that effective means is not provided for centering the coupling axially on the two adjacent ends of the tubing. Also, some prior art couplings have been of such a nature that they tend to damage the thin-wall tubing. Furthermore, although the prior art couplings with which I am familiar, have been relatively complicated and costly, they have not functioned as effectively as desired.

One of the objects of my invention is to provide a conduit coupling of the general type indicated which is extremely simple, being composed of a minimum number of parts, and which can be made and sold at a relatively low cost.

Another object of my invention is to provide a conduit coupling which is composed of few parts and which are of such a nature that they will interfit and may be combined as a unit for packaging, shipping and handling and thereby the danger of injury to the parts and separation and loss of the parts will be lessened.

Another object of my invention is to provide a conduit coupling which may be applied to the conduit with ease.

Another object of my invention is to provide a conduit coupling which is of such a nature that it will very effectively secure together the adjacent ends of the conduit, or one end of the conduit to an electric box or the like without danger of separation of the coupled parts.

Another object of my invention is to provide a coupling which is provided with means for automatically centering the unit axially on the end of the conduit when it is applied thereto.

Another object of my invention is to provide a coupling which is of such a nature as to permit limited non-axial relationship of adjacent sections of the conduit.

Still another object of my invention is to provide a coupling which is of such a nature that when applied to the conduit, expecially thin-wall tubing, there will be no damage to the conduit.

Various other objects will be apparent.

The preferred embodiment of my invention is illustrated in the accompanying drawing wherein.

Figure 1:
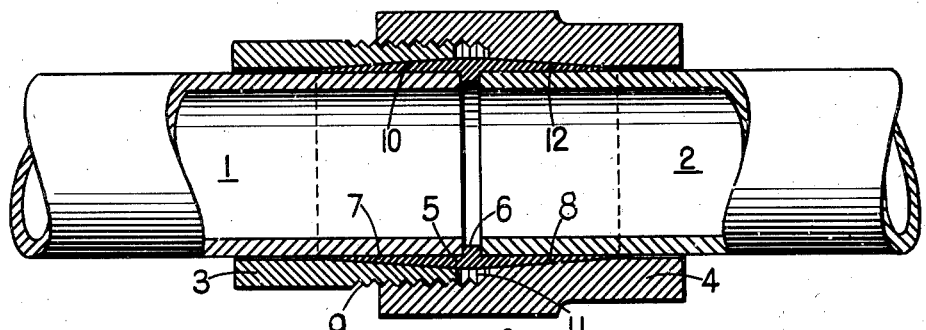
Figure 1 is a longitudinal sectional view of the coupling showing how it is used to connect tubing.
Figure 2:
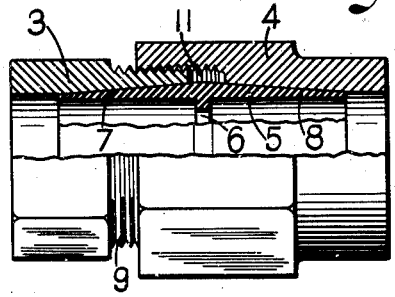
Figure 2 is a view, partly in side elevation and partly in longitudinal section, of the coupling unit.

With reference to the drawing, I have illustrated in Figures 1 and 2, one form of my coupling. In Figure 1, I show it in use on the adjacent sections 1 and 2 of tubing. The coupling is in the form of the unit illustrated in Figure 2 and consists of three pieces only, namely, the male nut 3, the female nut 4, and the compressible sleeve 5. Before application to the tubing, the parts of the coupling may be interfitted and combined into a single unit, as shown in Figure 2, and all the parts thereof will be protected.

The sleeve 5 may be formed of plastic, rubber or other compressible material. This type of sleeve is preferred when it is desired to obtain a fluid-tight seal. The sleeve 5 is of a constant diameter on its interior surface and has an annular inwardly projecting continuous shoulder 6 on its inner surface. The sleeve will closely embrace the ends of the tube sections 1 and 2 and the shoulder 6, which is formed midway between the ends of the sleeve, will extend between the adjacent ends of the tube and center the sleeve 5 axially relative to the sections 1 and 2, as shown in Figure 1. The outer surface of the sleeve 5 is tapered in opposite directions from its midpoint so as to provide the oppositely directed longitudinally extending annular portions 7 and 8 which are wedge-shape in longitudinal cross-section. The outer surface of each of the portions 7 and 8 tapers from the mid-point of the sleeve towards the axis thereof to a point at the outer end thereof.

The nuts 3 and 4 are provided with tapered inner surfaces for cooperating with the tapered outer surfaces of the sleeve 5 to cause the sleeve 5 to more tightly embrace the sections 1 and 2 and thereby provide a fluid-tight seal. The male nut 3 embraces the section 1 and has a threaded portion 9 on the exterior of the outer end thereof. Within the nut 3, there is formed a tapered socket 10 for receiving the tapered end 7 of the sleeve 5. The surface of this socket tapers reversely to that of the portion 7 of the sleeve, that is, it tapers longitudinally of the nut and towards the axis of the nut from a point at the outer end thereof towards the axis thereof to a point at the inner end of the socket. The female nut 4 embraces the section 2 and is provided with a threaded socket 11 at the outer end thereof which is adapted to receive the threaded end 9 of the nut 3. The nut 4 is provided with a tapered socket 12 for receiving the tapered end 8 of the sleeve 5. This socket tapers longitudinally of the nut towards the axis thereof from a point at the inner end of threaded socket 11 to the inner end of the socket 12.

Upon use of the coupling, the parts are separated, the nut 3 is slipped on tubing section 1 and the nut 4 is slipped on section 2 and both nuts are moved away from the ends thereof. Then the sleeve 5 is flipped over the end of one of the sections until the shoulder 6 contacts with the extreme end thereof. Then the end of the other section is slipped into the sleeve until it contacts shoulder 6. Thus, the sleeve will be centered automatically axially of the sections of tubing. The nuts 3 and 4 are then brought together. As the nuts are tightened, they exert a wedging action on the sleeve 5, causing it to compress and more tightly embrace the ends of the sections 1 and 2. Due to the provision of the compressible sleeve, the tube sections 1 and 2 do not need to be in exact axial alignment to obtain a fluid-tight seal. The outer end of each nut has an internal diameter slightly greater than the external diameter of the adjacent tubing section. This provides "play" between the end of the nut and tubing which permits the slight axial misalignment of the sections. However, even with such misalignment there is an effective seal due to the fact that pressure on sleeve 5 causes it to firmly embrace the tubing and spreads the thin ends thereof into the narrow annular spaces in the ends of the nuts.

Figure 3:
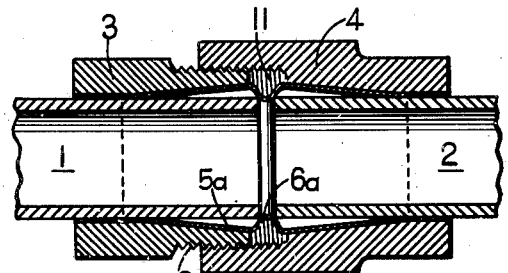
Figure 3 is a view similar to Figure 1 but showing a different type of compressible sleeve.
Figure 4:
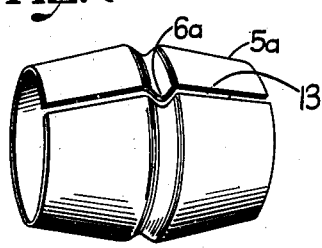
Figure 4 is a perspective view of the split sleeve used in the structure of Figure 3.

In Figures 3 and 4, I show a different type of sleeve. In this instance, the sleeve 5a may be of flexible metal or other similar material. It is provided with a slit 13 extending the full length thereof to make it readily contractible or compressible. Midway between its ends, in its outer surface, it is provided with a continuous groove which forms a continuous shoulder 6a on its inner surface. This sleeve will function substantially the same as the sleeve 5 except that it will not produce a fluid-tight seal.

Figure 5:
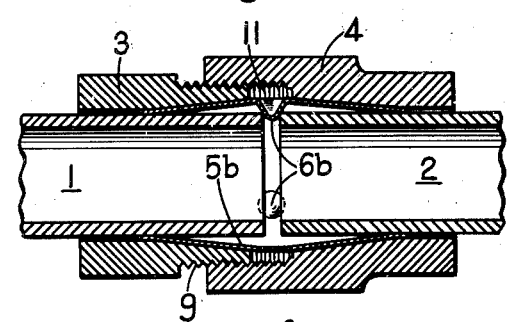
Figure 5 is a view similar to Figure 3, but showing another type of sleeve.
Figure 6:
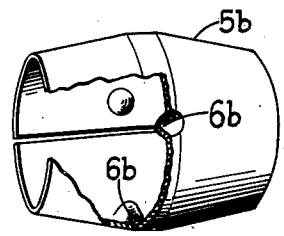
Figure 6 is a perspective view of the sleeve used in the structure of Figure 5.

Figures 5 and 6 show a sleeve structure similar to Figures 3 and 4 except that, in this instance, the centering means comprises a plurality of circumferentially spaced teats 6b formed by indentations in the exterior of the sleeve 5b midway between its ends.

In the use of each of the forms of my coupling shown in Figures 3 to 6, it will function effectively even though the tubing sections are not in exact axial alignment. This is due to the fact that the walls at the ends of the sleeves 5a and 5b are so tapered, that the sleeve is of sufficiently larger diameter adjacent its midpoint that there can be considerable "play" between the ends of the tubing and the sleeve, as shown in Figures 3 and 5. Also, there is "play" at the ends of the nuts as previously described when sleeve 5a is contracted, the shoulder 6a is wedged between the ends of the tubing and this causes longitudinal spreading of the ends of the sleeve into the annular spaces at the ends of the nuts and firm contact with the nuts at these points. The teats 6b will function in the same manner.

Figure 7:
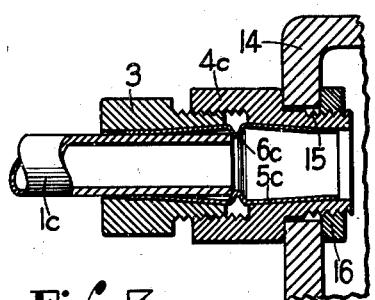
Figure 7 is a longitudinal sectional view showing how a modification of the coupling can be used in securing the end of a conduit to an electric fuse or cut-out box.

In Figure 7 I have illustrated a modification of my coupling which can be used for securing the end of a conduit to an electric fuse box or cut-out box, the wall of which is indicated by the numeral 14. The coupling unit may be made exactly like that of Figure 3 with the exception that the outer end of nut 4c is externally threaded, as indicated at 15. This threaded end is passed through an opening in the wall 14 of the box and a lock-nut 16 is threaded thereon. The shoulder 6c of sleeve 5c will contact the end of conduit 1c and will properly locate the sleeve axially. Thus, the conduit will be connected effectively to the box. If desired, the outer end of the female nut may be threaded externally, as in Figure 7, as well as internally, as in Figure 3, so that the coupling may serve for both purposes.

It will be apparent from the above description that I have provided a coupling which is especially suitable for use on thin-wall tubing. The coupling consists of a simple and inexpensive unit composed of a minimum number of interfitting parts. The parts are of such a nature that when combined as a unit, all of the parts will be protected from damage, there will be little danger of separation of the parts before the unit is applied to the tubing or other units to be coupled together and no danger of separation after being applied thereto. The coupling may be applied to the tubing with ease and will automatically center itself axially on the tubing. It will very effectively secure together the units to be coupled without danger of injury thereto. Furthermore, it will function effectively to connect tubing even if adjacent sections are not in exact axial alignment.

Having thus described my invention, what I claim is:

A conduit coupling for connecting the plain end of a conduit to a suitable member comprising a nut adapted to be associated with said member and an interfitting nut adapted to be associated with the end of the conduit, a compressible sleeve surrounding the end of said conduit, said sleeve having an inward projection adapted to extend over the end of the conduit to position the sleeve axially thereof, said sleeve having tapered surfaces extending in opposite directions longitudinally from a point intermediate the ends thereof inwardly towards the axis thereof, said nuts having cooperating tapered surfaces which extend in a reverse direction so that relative movements of the nuts and sleeve will cause the sleeve to tightly grip the conduit, and one of the nuts having exterior threads which can be passed through an opening in said member so that a lock nut can be threaded on said exterior threads to lock the coupling to said member.

SAMUEL M. MELTON.

REFERENCES CITED

The following references are of record in the file of this patent:

UNITED STATES PATENTS

| Number | Name | Date |
|---|---|---|
| 1,174,297 | Story | Mar. 7, 1916 |
| 1,820,984 | McKee | Sept. 1, 1931 |
| 1,843,202 | Buchanan | Feb. 2, 1932 |
| 2,158,757 | Kuestermeier | May 16, 1939 |
| 2,241,293 | Campbell | May 6, 1941 |
| 2,355,871 | Kraft | Aug. 15, 1944 |